(12) United States Patent
Hassani et al.

(10) Patent No.: US 12,323,420 B2
(45) Date of Patent: Jun. 3, 2025

(54) BIOMETRIC SERVICE EVALUATION ARCHITECTURE FOR A VEHICLE

(71) Applicant: Ford Global Technologies, LLC, Dearborn, MI (US)

(72) Inventors: Ali Hassani, Ann Arbor, MI (US); Justin Miller, Berkley, MI (US); Alexandra Taylor, Harbor Springs, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 17/974,988

(22) Filed: Oct. 27, 2022

(65) Prior Publication Data

US 2024/0146723 A1    May 2, 2024

(51) Int. Cl.
*H04L 9/40* (2022.01)
*G07C 5/08* (2006.01)

(52) U.S. Cl.
CPC ........ *H04L 63/0861* (2013.01); *G07C 5/0816* (2013.01)

(58) Field of Classification Search
CPC ........................... H04L 63/0861; G07C 5/0816
See application file for complete search history.

(56) References Cited

U.S. PATENT DOCUMENTS

| | | | |
|---|---|---|---|
| 8,549,318 B2 | 10/2013 | White et al. | |
| 8,878,669 B2 | 11/2014 | Nothacket et al. | |
| 10,486,649 B1 * | 11/2019 | Bennie | B60R 25/1004 |
| 10,653,358 B2 | 5/2020 | Nothacket et al. | |
| 12,131,819 B1 * | 10/2024 | Murray | G16H 20/13 |
| 2020/0117690 A1 * | 4/2020 | Tran | G06F 16/90332 |
| 2020/0193005 A1 | 6/2020 | Babala et al. | |
| 2020/0337631 A1 | 10/2020 | Sahin | |
| 2021/0001810 A1 * | 1/2021 | Rivard | G06V 40/172 |
| 2021/0269045 A1 * | 9/2021 | Katz | G02B 27/0093 |
| 2022/0041134 A1 | 2/2022 | Hassini et al. | |
| 2022/0135002 A1 | 5/2022 | Hassini et al. | |

(Continued)

FOREIGN PATENT DOCUMENTS

| | | |
|---|---|---|
| CN | 103692913 A | 4/2014 |
| WO | 2020097968 A1 | 5/2022 |

*Primary Examiner* — Stephen T Gundry
(74) *Attorney, Agent, or Firm* — Frank Lollo; Price Heneveld LLP

(57) ABSTRACT

A biometric evaluation system for a vehicle includes a vision sensor configured to detect a biometric quality of a user. The biometric evaluation system also includes an operational system for the vehicle. At least one processor is in communication with the vision sensor. The processor is configured to execute a first classification algorithm that performs a first biometric validation based on the biometric quality to estimate a state of the user. The first classification algorithm requires a first service latency. In response to an outcome of the first biometric validation, the at least one processor is further configured to execute a second classification algorithm that performs a second biometric validation to confirm the state of the user. The second classification algorithm requires a second service latency greater than the first service latency. The processor is further configured to communicate a signal to modify operation of the vehicle.

20 Claims, 9 Drawing Sheets

(56) References Cited

U.S. PATENT DOCUMENTS

| | | |
|---|---|---|
| 2022/0172530 A1 | 6/2022 | Amadi et al. |
| 2022/0193915 A1* | 6/2022 | Marinkovich ... G05B 19/41865 |
| 2022/0277064 A1* | 9/2022 | Streit .................. G06V 40/172 |
| 2023/0065399 A1* | 3/2023 | Ren ..................... G06V 20/597 |
| 2023/0182759 A1* | 6/2023 | Wright ................ B60W 40/09 |
| | | 701/24 |
| 2023/0351831 A1* | 11/2023 | Khadloya ........... H04L 63/0861 |
| 2024/0087341 A1* | 3/2024 | Ren ..................... G06V 40/171 |
| 2024/0104941 A1* | 3/2024 | Ren ....................... G06V 20/59 |
| 2024/0111283 A1* | 4/2024 | Cella ..................... G05D 1/226 |
| 2024/0112562 A1* | 4/2024 | Sicconi ................. G07C 5/085 |
| 2024/0127639 A1* | 4/2024 | Cella ..................... G06Q 50/06 |
| 2024/0142777 A1* | 5/2024 | Taylor ................. G02B 27/017 |
| 2024/0142966 A1* | 5/2024 | Gammelgard ........ B60R 25/045 |
| 2024/0174219 A1* | 5/2024 | Nister ................ B60W 30/095 |
| 2024/0192691 A1* | 6/2024 | Sonalker ................ G08G 1/202 |
| 2024/0211565 A1* | 6/2024 | Streit .................... G06F 21/602 |
| 2024/0249306 A1* | 7/2024 | Scholl ................... G07C 5/008 |
| 2024/0273411 A1* | 8/2024 | Mueck ................ H04L 9/3263 |

\* cited by examiner

BIOMETRIC SERVICE EVALUATION ARCHITECTURE FOR A VEHICLE

FIELD OF THE DISCLOSURE

The present disclosure generally relates to a biometric service evaluation architecture and, more specifically, to computationally efficient systems and methods for performing biometric service evaluation in a vehicle environment.

BACKGROUND OF THE DISCLOSURE

Detecting the status of a driver of a vehicle, such as an identity or a liveliness level, typically requires time-consuming active steps that may require significant effort or computational capacity to verify biometric requirements. Conventional computing architectures may not be properly divided into fast, low-latency operations and lengthy, high-latency operations. As a result, there is a need for a less computationally heavy and time-optimized architecture for validating a state of a user of the vehicle.

SUMMARY OF THE DISCLOSURE

According to a first aspect of the present disclosure, a biometric evaluation system for a vehicle includes a vision sensor configured to detect at least one biometric quality of a user. The biometric evaluation system also includes an operational system for the vehicle. At least one processor is coupled with a memory and is in communication with the vision sensor. The processor is configured to execute a first classification algorithm that performs a first biometric validation based on the at least one biometric quality to estimate a state of the user. The first classification algorithm requires a first service latency. In response to an outcome of the first biometric validation, the at least one processor is further configured to execute a second classification algorithm that performs a second biometric validation based on the at least one biometric quality to confirm the state of the user. The second classification algorithm requires a second service latency greater than the first service latency. The processor is further configured to communicate a signal to the operational system to modify operation of the vehicle based on at least one of the first and the second biometric validations.

Embodiments of the first aspect of the present disclosure can include any one or a combination of the following features:
- the first and second service latencies include first and second response times, respectively;
- the first response time is less than the second response time;
- the at least one processor includes a local processor and an edge processor in communication with the local processor, wherein the local processor is configured to execute the first classification algorithm and the edge processor is configured to execute the second classification algorithm;
- the outcome of the first classification algorithm is one of a pass condition and an unsuccessful condition, and wherein the at least one processor is configured to execute the second classification algorithm in response to the unsuccessful condition;
- the first classification algorithm is biased toward the unsuccessful condition;
- wherein the operational system includes an electromechanical output device selectively energized based on the signal;
- the operational system is a powertrain system and the communication of the signal is performed in response to an unsuccessful condition of each of the first and second biometric validations;
- the outcome of the first classification algorithm is one of a pass condition and an unsuccessful condition, and wherein the at least one processor is configured to execute the second classification algorithm in response to the pass condition;
- the outcome of the first classification algorithm and an outcome of the second classification algorithm are each one of a multi-state output corresponding to an emotional state of the user;
- the first classification algorithm performs facial landmark analysis based on image data captured by the vision sensor and the second classification processes the image data in a neural network;
- the at least one processor is further configured to recursively track an output of the first biometric validation applied to the user to determine a false negative rate of the first biometric validation for the user, and modify the first biometric validation based on the false negative rate;
- modifying the first biometric validation includes bypassing execution of the first classification algorithm;
- modifying the first biometric validation includes performing an alternative biometric validation based on the at least one biometric quality in lieu of performing the first biometric validation; and
- the state is one or more of a liveliness level of the user, an identity of the user, an inebriated state of the user, and an engagement level of the user.

According to a second aspect of the present disclosure, a biometric evaluation system includes a vision sensor configured to detect at least one biometric quality of a user. An electromechanical output device is selectively energized based on an evaluation of the at least one biometric quality of the user. A first processor is coupled with a memory and is in communication with the vision sensor. The first processor is configured to execute a first classification algorithm that performs a first biometric validation based on the at least one biometric quality to estimate a state of the user. The first classification algorithm requires a first response time. A second processor is in communication with the first processor and is configured to, in response to an outcome of the first biometric validation, execute a second classification algorithm that performs a second biometric validation based on the at least one biometric quality to confirm the state of the user. The second classification algorithm requires a second response time. The second response time is longer than the first response time. An operational system that is in communication with the first and second processors is configured to limit actuation of the electromechanical output device in response to not passing of both the first and second biometric validations.

Embodiments of the second aspect of the present disclosure can include any one or a combination of the following features:
- the at least one processor is further configured to recursively track the outcome of the first biometric validation applied to the user to determine a false negative rate of the first biometric validation for the user, and modify the first biometric validation based on the false negative rate;
- modifying the first biometric validation includes bypassing execution of the first classification algorithm; and the electromechanical output device is configured to control a security operation for a building.

According to a third aspect of the present disclosure, a method to evaluate a biometric quality of a driver of a vehicle includes capturing at least one image of the driver via a vision sensor. The method further includes executing, via at least one processor that is in communication with the vision sensor, a first classification algorithm that performs a first biometric validation based on the biometric quality to estimate a state of the driver. The first classification algorithm requires a first processing power level. The method further includes based on the estimation of the state of the driver, executing, at the at least one processor, a second classification algorithm that performs a second biometric validation based on the biometric quality to confirm the state of the driver. The second classification algorithm requires a second processing power level. The second processing power level is greater than the first processing power level. The method further includes communicating an instruction to adjust an operational system of the vehicle in response to the state of the driver.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
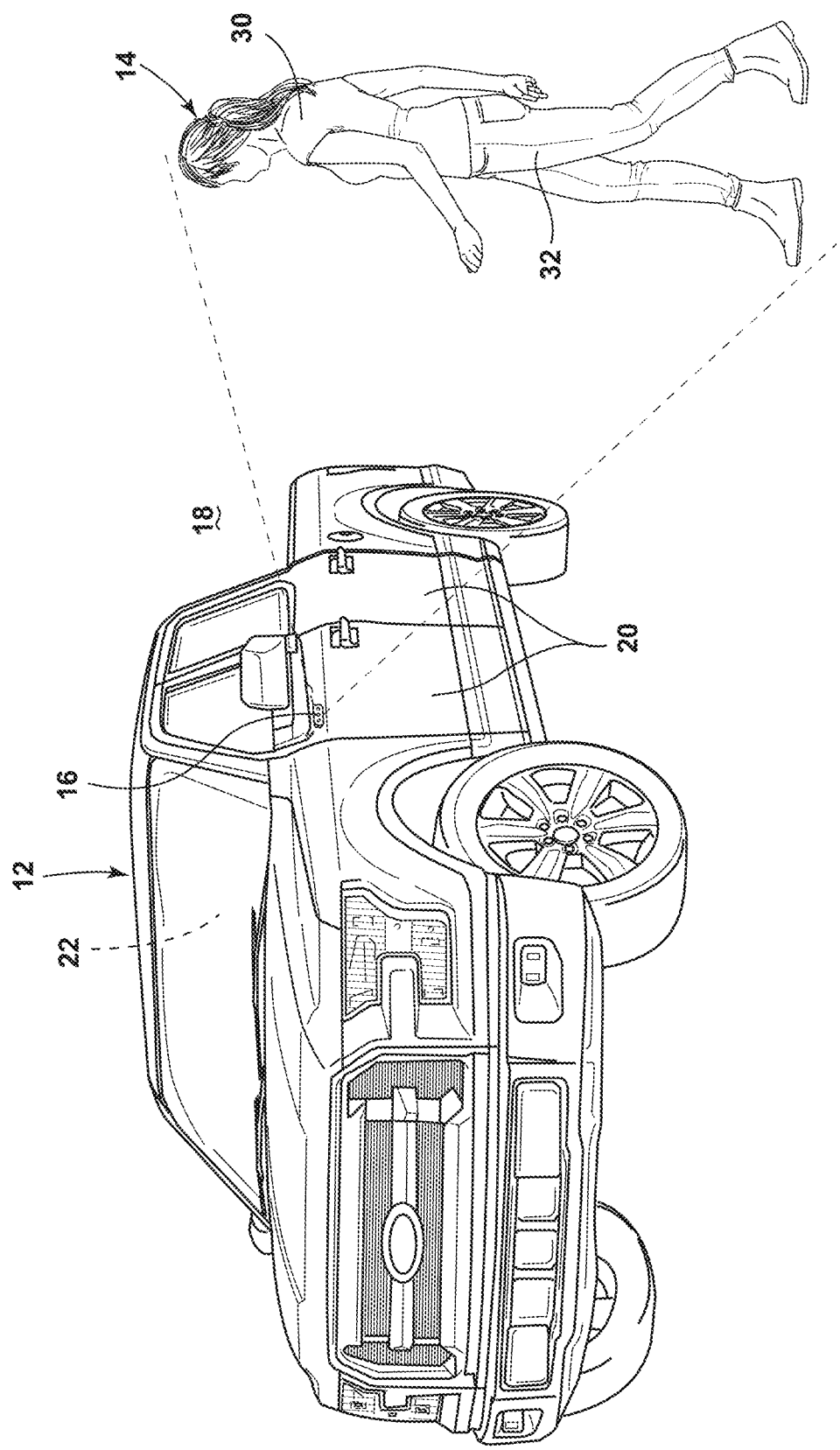
FIG. 1 is a perspective view of a vehicle incorporating a biometric evaluation system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a biometric service evaluation architecture for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure provides for an algorithm architecture for computations and analysis of biometric services. The present architecture first evaluates a relatively simple rapid test via a relatively low-power, lightweight method of analyzing a biometric quality. If the first evaluation results in an unsuccessful result, a more complex evaluation may be performed that may require more computational power, more electrical power, and/or a greater degree of user involvement. In other examples, a service latency for the rapid test may differ from the service latency of the complex test. Thus, the algorithm architecture of the present disclosure may provide for increased efficiency in time and/or power requirements to identify a driver status, such as an inebriated state, a distracted state, a liveliness level, or the like, as will be further discussed herein.

Referring generally to FIGS. 1-8, reference numeral 10 generally designates a biometric evaluation system. Although illustrated and described throughout the disclosure as being incorporated with a vehicle 12, it is contemplated that the system 10 of the present disclosure may be incorporated with a stationary structure, such as a building, or any other structure that implements biometric evaluation and/or validation. For example, the system 10 may be employed on a mobile device (e.g., a smartphone or tablet) or with a building security system for authenticating users to enter an area or limit access to the area (e.g., a security door). Thus, and as will be described further, the system 10 may incorporate an electromechanical device, such as an electromagnetic lock/bolt, that may be operable as a security feature for a structure or device.

The biometric evaluation system 10 of the present disclosure is configured to monitor a biometric quality of a user 14, analyze the biometric quality, and determine a state of the user 14 based on the biometric quality. The state of the user 14 may be an identity of the user 14, an emotional state of the user 14, a mental state of the user 14, an inebriated state of the user 14, or the like. For example, as depicted in FIG. 1, a vision sensor 16 may be employed adjacent to an exterior 18 of the vehicle 12 in order to capture an image of the user 14 to determine an identity of the user 14. Based on the identity of the user 14, the biometric evaluation system 10 of the present disclosure may communicate instructions to unlock or open a door 20 to allow access to an interior 22 of the vehicle 12. As will be clear in the foregoing examples, other biometric services may be evaluated by the present system 10 and other vehicle operations may be controlled in response to such evaluations.

Figure 2A:
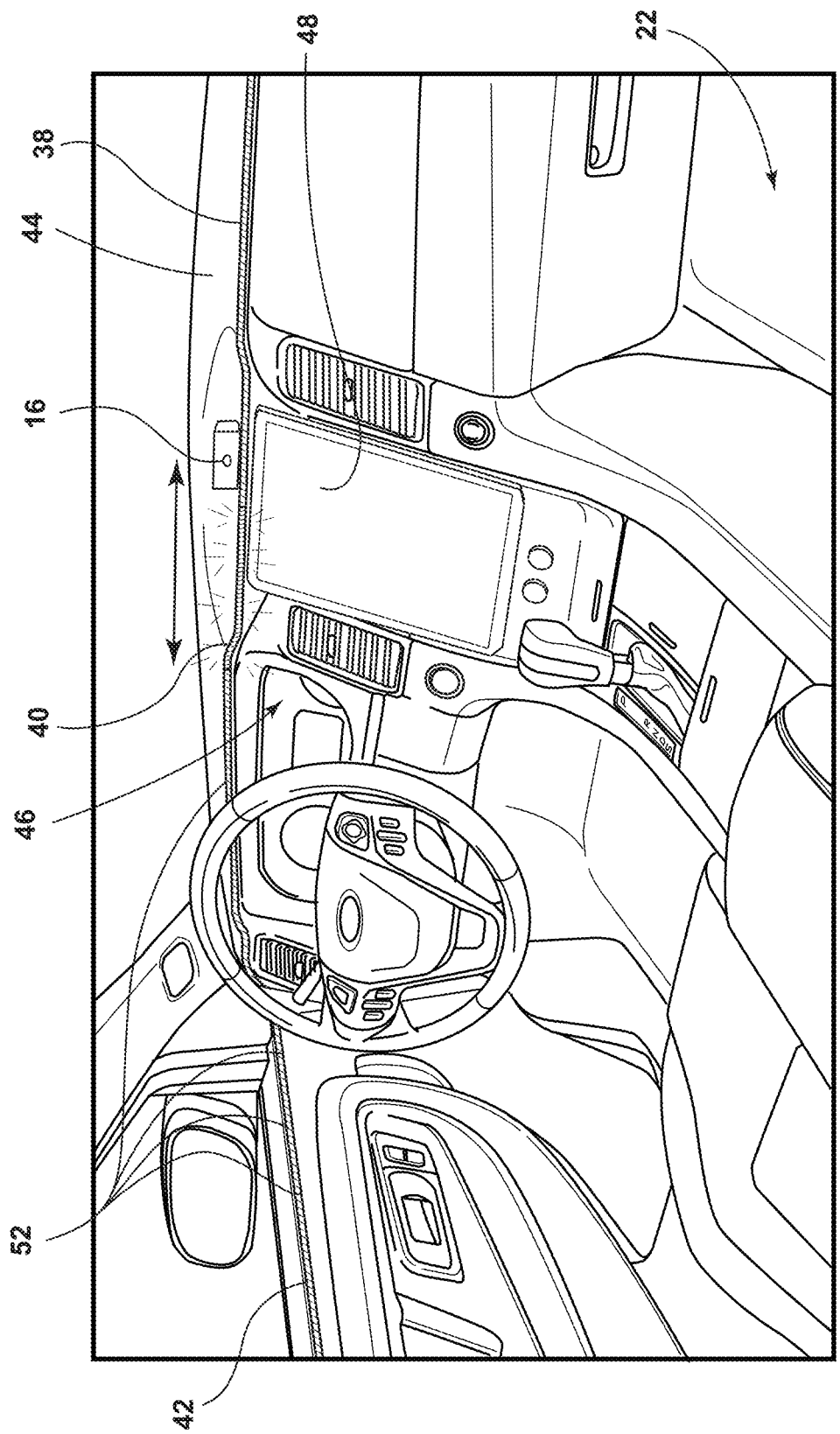
FIG. 2A is a perspective view of an interior of a vehicle incorporating at least one vision sensor for a biometric evaluation system of the present disclosure.
Figure 2B:
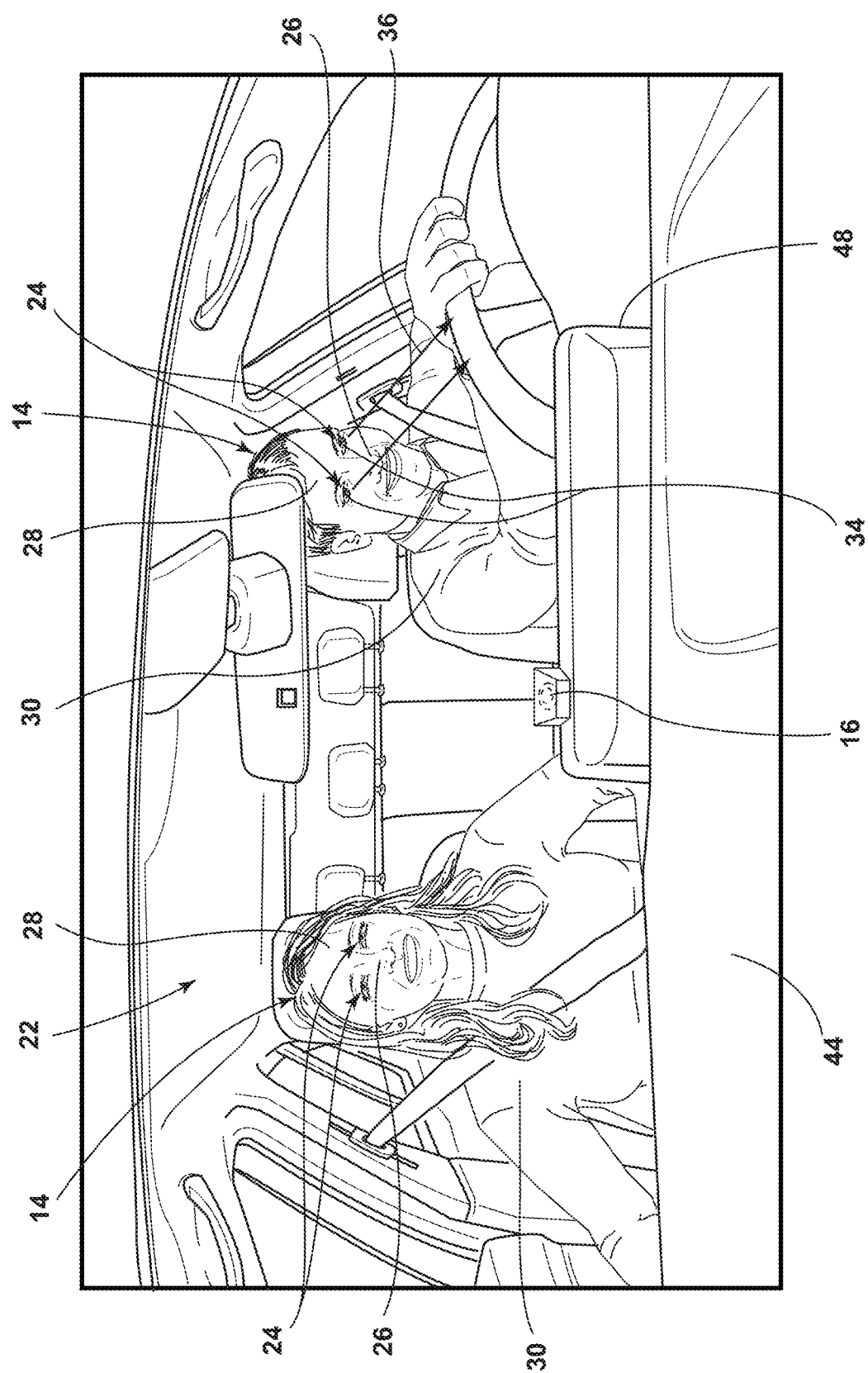
FIG. 2B is a vehicle-rearward perspective view of passengers of the vehicle of FIG. 2A.

Referring now to FIGS. 2A and 2B, the vision sensor 16 may additionally, or alternatively, be incorporated into the interior 22 of the vehicle 12, such as a vehicle cabin. As depicted, the vision sensor 16 may be an image sensor, or imaging device, configured to capture an image of the interior 22 and, more particularly, an image of the user 14. It is contemplated that "user" may refer to a driver of the vehicle 12 or a non-operator passenger in the vehicle 12. With particular reference to FIG. 2B, the vision sensor 16 may be configured to capture image data corresponding to various physical features, such as facial and body features, in order to estimate and/or determine the state of the user 14. For example, the vision sensor 16 may capture images of eyes 24, a nose 26, a forehead area 28, and the like of a face of the user 14. Further, the vision sensor 16 may capture images of upper and lower body portions 30, 32 of the user 14 (FIG. 1) in order to determine a body pose of the user 14. Based on the physical features of the user 14, the biometric evaluation system 10 of the present disclosure may estimate or determine the state of the user 14 by, for example, comparing the one or more biometric qualities of the user 14 captured in the image data to target or expected image data.

For example, if the biometric evaluation system 10 is performing an identification function, the biometric evaluation system 10 may process images of the eyes 24 of the user 14 (e.g., the driver) to scan an iris 34 of the eye 24 with light (e.g., infrared (IR) light, near-infrared (NIR) light, visible light) to compare a reflected pattern of light to a unique pattern of light specific to the user 14. In some implementations, thermal imaging may be performed by the system 10 using IR or NIR light and a thermal imager. Other identification functions may be performed based on features, such as eye color, facial geometries, or other feature extraction routines employed by the system 10. In another example, the biometric evaluation system 10 is configured to perform an inebriation detection function. In this example, images of the eyes 24 may be processed in order to determine a gaze direction 36, a pupil dilation, a color of the eyes 24 (e.g., a bloodshot color), or an inability to track moving objects captured by the vision sensor 16 (e.g., a passing vehicle, a passing pedestrian, and the like). As will be described further herein, unsuccessful completion of initial tests for these biometric services may result in a more computationally heavy function being executed by the system 10 in order to verify or validate the test result.

One exemplary test for detecting a non-operating state of the driver includes operation of an illumination assembly 38 to generate a light 40 in the cabin of the vehicle 12. As exemplarily depicted in FIG. 2A, the illumination assembly 38 may include a light guide 42 extending adjacent to a dashboard assembly 44 or in an interface area 46 of the cabin. It is contemplated that the illumination assembly 38 may be positioned near the vision sensor 16 or at a front of the vehicle 12 to allow the gaze direction 36 to be tracked. It is further contemplated that a human-machine interface (HMI 48) in the vehicle 12 may be operable to perform the tests expected by the illumination system 38.

The illumination assembly 38 may include a driver circuit 50 (FIG. 3) and a plurality of light sources 52 behind the light guide 42. The driver circuit 50 may control illumination of each of the light sources 52 to cause the light 40 to move along the light guide 42 between left and right directions. In the example test, the vision sensor 16 may capture movement of the eyes 24 of the user 14 to track a focus of the user 14. For example, LEDs may be mounted to a portion of the vehicle 12 interior 22 (e.g., the dashboard assembly 44, the HMI 48, etc.) for outputting a light pattern in a generally horizontal orientation. Such light patterns may be projected by the illumination assembly 38 during an inebriation, or drunkenness, test to check horizontal eye gaze nystagmus conditions of the user 14. In particular, the illumination assembly 38 may be selectively activated to cause a sequential lighting condition from left to right and right to left with audible instructions or visual instructions communicated to the user 14 to instruct the user 14 to track the light 40. During such test, the vision sensor 16, such as an imager, may capture the gaze direction 36 and/or pupil/iris qualities, and one or more processors 54, 56, 58 (FIG. 3) may process such image data to identify a nystagmus condition. It is contemplated that this example is nonlimiting and that other devices configured to detect or verify the state of the driver as determined based on the vision sensor 16 may be employed. For example, a breathalyzer may be employed in conjunction with a second, stronger test for validating an alcohol consumption level or inebriation state of the user 14 upon a negative result of a first, less involved test or in tandem with a first less computationally heavy test.

Figure 3:
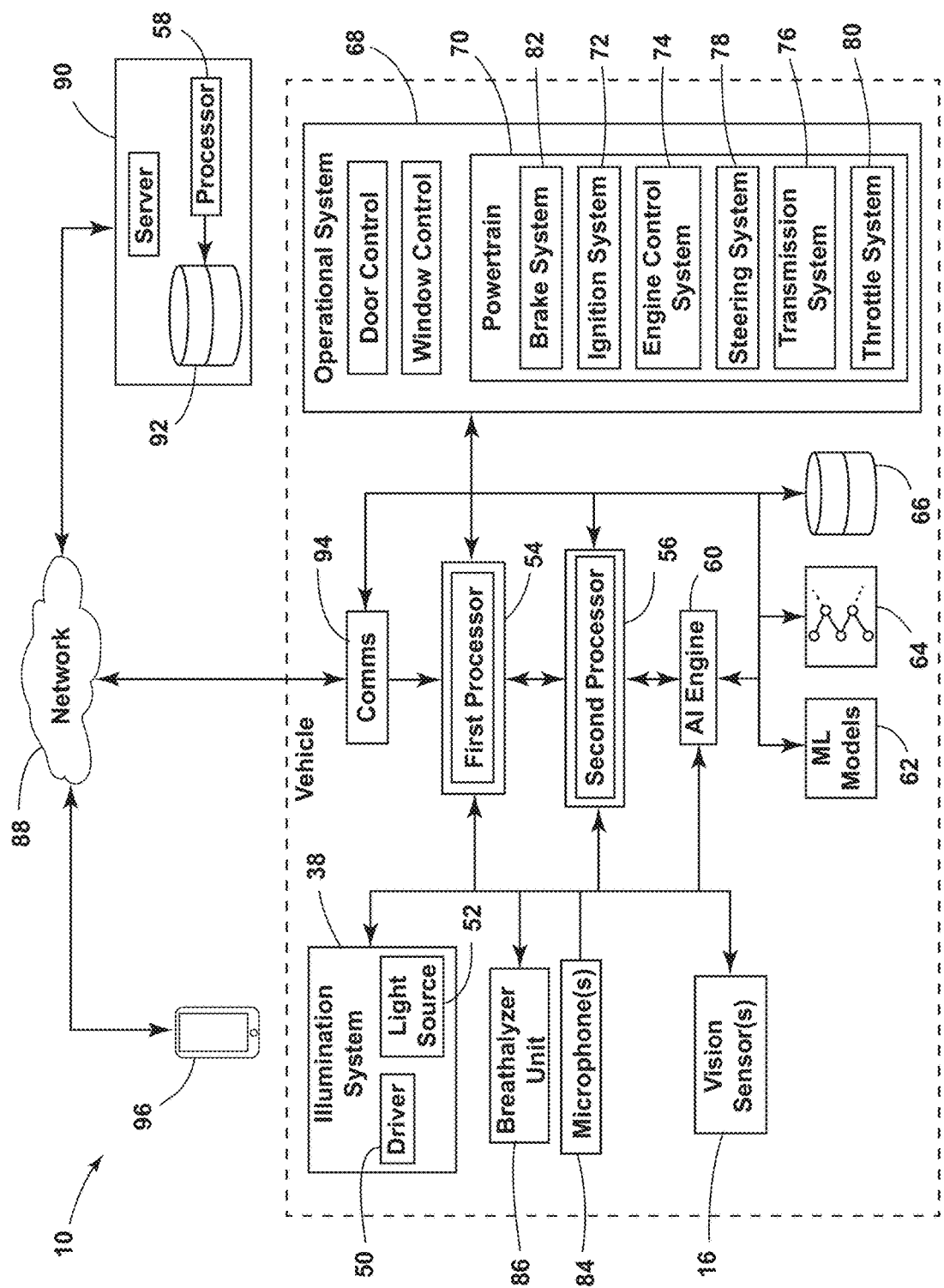
FIG. 3 is a block diagram of an exemplary biometric evaluation system of the present disclosure.

Referring now more particularly to FIG. 3, the biometric evaluation system 10 of the present disclosure may include one or more processors 54, 56, 58 in communication with one or more of the vision sensing devices 16 previously described. By way of example, the one or more processors 54, 56, 58 may include a first processor 54 and a second processor 56, with the first processor 54 configured to perform initial estimation testing, and the second processor 56 executing verification algorithms to validate the estimation. In other examples, the initial estimation testing and the validation algorithm are performed on a common processor (e.g., the first processor 54). In general, the first processor 54 may be operable as an edge computing device for relatively low-power operations, and the second processor 56 may be a computing device for processing data from various subsystems of the vehicle 12 for relatively high-power operations, such as a local processor coupled with the vehicle 12 and interposing communication between various edge-computing devices and vehicle operational systems 68.

The low-power operations may correspond to low computational or electrical power levels, such as shorter/lower computational latency and/or response time, lower electrical power consumption, or the like. Similarly, the high-power operations may correspond to high computational or electrical power levels such as longer/higher computational latency and/or response times, higher electrical power consumption, or the like. In general, the power levels for each operation differ in timing, and the system may therefore be utilized to optimize when to employ either algorithm, and which test to perform to enhance the overall biometric operational experience. It is contemplated that the service latency, which may refer to the time from initial frame acquisition to classification output, may be less for the tests having low computational power level requirements compared to the tests service latency for the high computational power level requirements. Thus, although the processing time (e.g., the time to process one frame or many frames) may be the same in either test, the overall service latency may nonetheless be different amongst the rapid and complex tests. In some examples, the single-frame processing time may exceed the multi-frame processing time, but the overall service latency for the single-frame method may be faster due to only requiring capturing a single frame. In some examples, a single processor is employed to perform both algorithms. One or both of the first and second processors 54, 56 may include or be in communication with an artificial intelligence engine 60. The data captured via the vision sensors 16 may be processed in the artificial intelligence engine 60 to train machine learning models 62 for prediction of driver state estimation. In addition, or in the alternative, the data captured may be processed in a neural network 64 to identify the physical features of the occupant 14.

A local database 66 (e.g., a memory) may be in communication with the one or more processors 54, 56, 58 and/or the artificial intelligence engine 60 and be configured to store historical data related to one or more users 14 of the vehicle 12. For example, the local database 66 may store identification data (e.g., fingerprint data, iris 34 identification data, name data, etc.) of users 14 of the vehicle 12. As will be further described in relation to the proceeding figures, the database may further store historical data related to success rates, rates of unsuccessful testing, efficacy rates, or efficiency data specific to particular tests for driver state estimation. For example, the local database 66 may store a running average, median, or other statistical quality related to how many false negatives of a given test (e.g., an emotional state algorithm) were inaccurate relative to a second, stronger, more computationally heavy test (e.g., 3D regression modeling).

With continued reference to FIG. 3, the one or more processors 54, 56, 58 may be in communication with one or more operational systems 68 of the vehicle 12. In general, the operational systems 68 may be restricted or otherwise limited in response to the one or more processors 54, 56, 58 determining a negative condition of a user state, or for determining a particular state of the driver consistent with being unfit for operation of the vehicle 12. Accordingly, the operational systems 68 may include one or more powertrain subsystems for controlling a movement of the vehicle 12, a gear position of the vehicle 12, or the like. In some examples, the powertrain system 70 includes an ignition system 72, an engine control system 74, a transmission system 76, a steering system 78, a throttle system 80, a brake system 82, and/or any other system configured to transmit mechanical propulsion or direction for the vehicle 12 or provide operation of the vehicle 12. In general, the operational systems 68 may be configured to control an electromechanical device, such as a motor, a solenoid, a valve, or the like, associated with the particular operational system. In this way, the electromechanical device may be selectively energized based on the evaluation by the software. In a non-limiting example, determination of an inebriated state of the user 14 by the present dual algorithm may result in a pull-over instruction communicated by the one or more processors 54, 56, 58 to the operational system 68. In response to receiving the pull-over instruction, the operational system 68 may control the steering system 78, the transmission system 76, and/or the engine control system 74 to control the vehicle 12 off of the road or adjacent a side of the road. In other examples, the state of the driver may be determined prior to operation of the vehicle 12 from a stationary position, such as an inebriation state test of the driver prior to changing gears from park to another gear.

Other hardware may be provided in the vehicle 12 for validating the state of the user 14. For example, the previously described illumination system 38 may be employed for generating a light corresponding to a target location for the gaze direction 36 of the user 14. In some examples, one or more microphones 84 or other audio recording devices may be employed for capturing audio data related to an emotional or mental state of the user 14. A breathalyzer mechanism 86 may further be included to verify an inebriation state of the user 14.

Still referring to FIG. 3, the biometric evaluation system 10 may include a network 88 that is configured to provide communication between the various systems within the vehicle 12, as well as to provide communication between the systems of the vehicle 12 and remote devices, such as a server 90. The server 90 may incorporate the remote processing device 58 and a remote database 92 in communication with the remote processing device. In some examples, the remote database 92 stores cohort data applicable across a plurality of biometric evaluation systems in order to accumulate data across a diversity of users. Such data may be employed to promote or demote particular modes of biometric testing based on false negative/positive rates, as will be discussed further herein. Other remote devices include cloud computing devices such as the cloud computing processor 58 in communication with the server 90. In some examples, the various operational systems 68 of the vehicle 12 may be in communication with the network 88 via a communication module 94. The communication module 94 and the network 88 may be configured for wired or wireless communication. For example, the communication may include one or more protocols, such as Wi-Fi, Ethernet, Bluetooth®, Ultra-Wideband (UWB), Zigbee®, 5G, 4G, 3G, or any other shortwave or longwave radio communication protocol. The communication module 94 may provide communication between the vision devices as well as the additional hardware (e.g., breathalyzer mechanism 86, illumination system 38), as well as the one or more processors 54, 56, 58, the operational systems 68, and/or one or more mobile devices 96 associated with the user 14.

As will further be described herein, it is contemplated that the cloud computing device, alternatively referred to as a remote processor 58, may be employed for the more computationally heavy algorithm execution of the present disclosure, and the local or edge processors may be employed to perform initial, computationally light algorithms. For example, the rapid-precise architecture for analyzing the biometric quality of the user 14 may include using a rapid test to determine a driver engagement level, via the one or more local processors and, in response to determining that the user 14 (e.g., the driver) is not engaged with control of the vehicle 12 (e.g., steering, gas control, braking), the remote processor 58 may execute the high-power algorithm to verify the estimated engagement level via one or more of the remote processing devices. As previously described, in other examples, the rapid testing may be performed on an edge-computing device (e.g., the first processor 54), and the heavy algorithm may be executed on a local processing device (e.g., the second processor 56). In still other examples, both the heavy and light computational algorithms may be performed on a common processor local to the vehicle 12. In this way, biometric profiled may be stored locally, the system 10 may not rely on cloud-connection, and service latency may be reduced.

Figure 4:
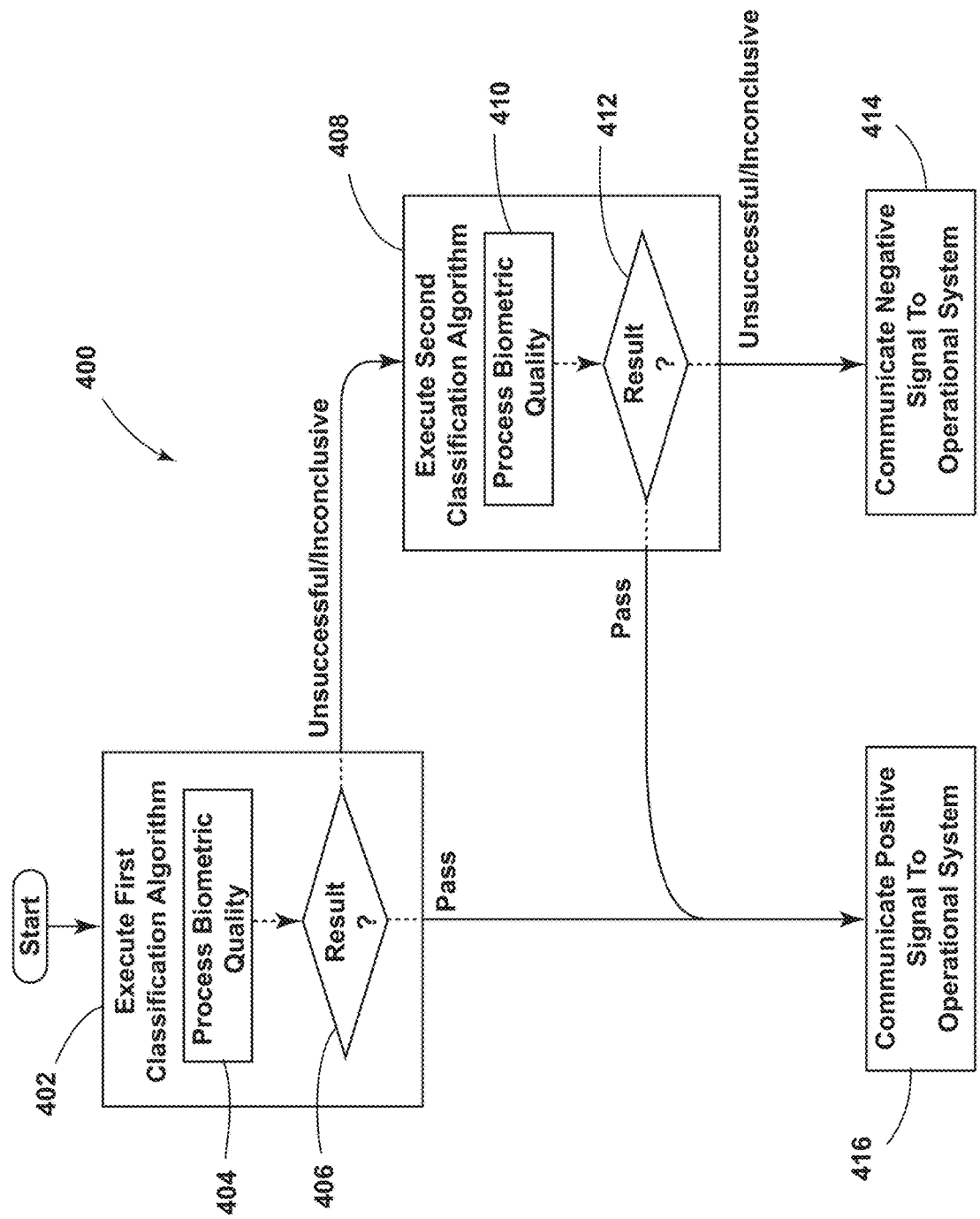
FIG. 4 is a method of performing biometric validation according to one aspect of the present disclosure.
Figure 5:
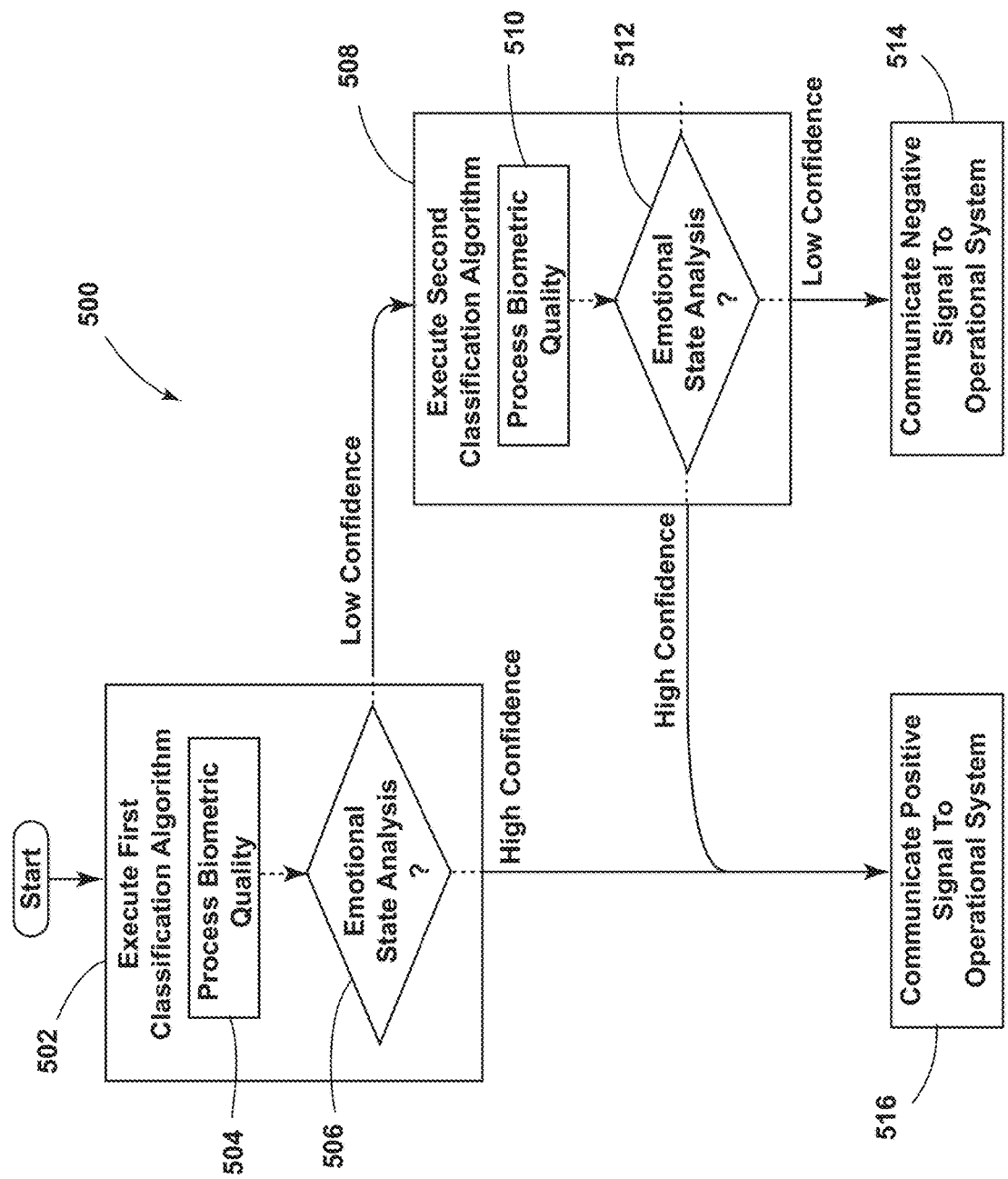
FIG. 5 is a method of performing biometric validation according to one aspect of the present disclosure.
Figure 6:
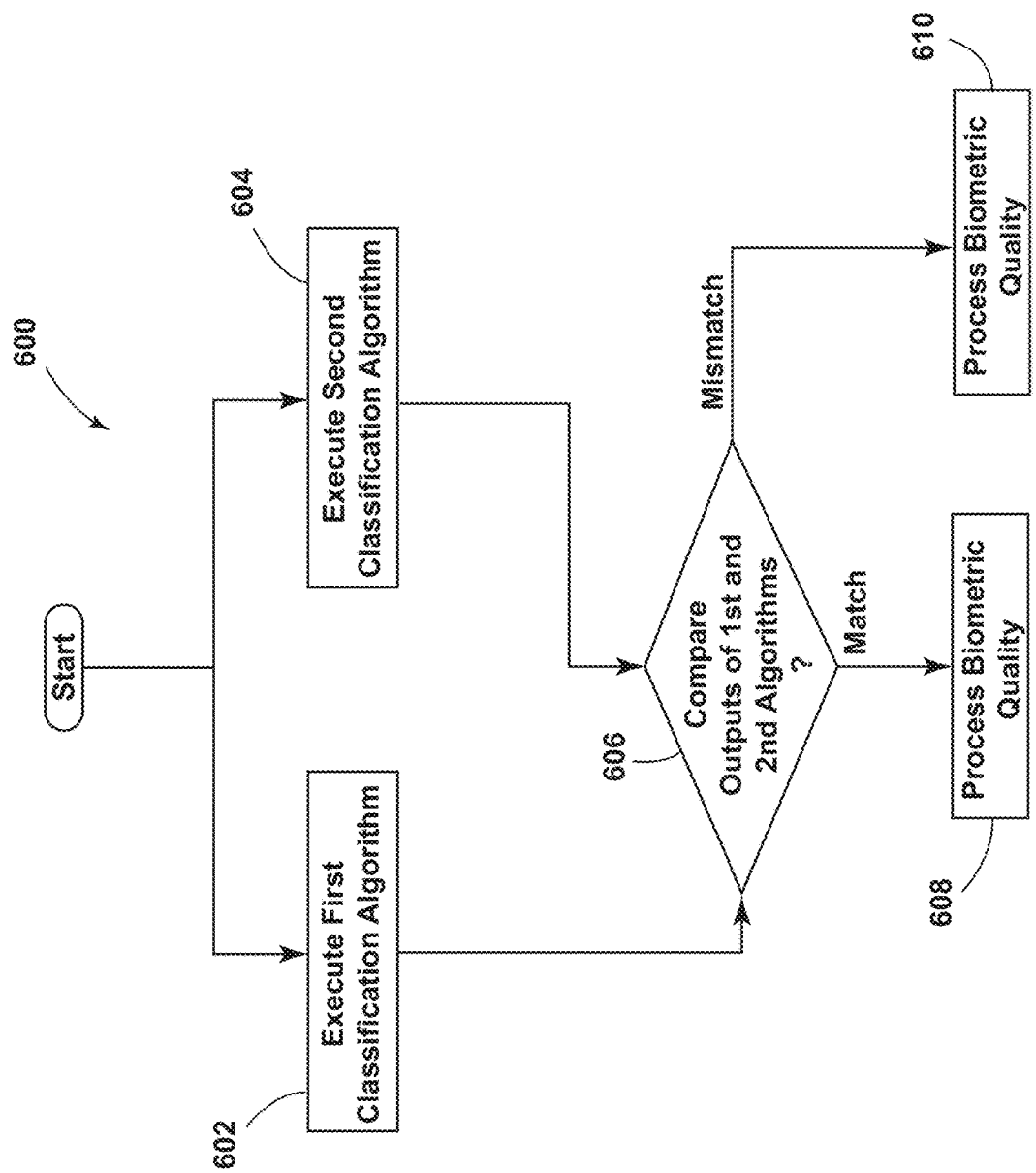
FIG. 6 is a method of performing biometric validation according to one aspect of the present disclosure.

Referring now generally to FIGS. 4-6, various implementations of the present software architecture are employed to achieve a more computationally efficient outcome for determining driver states. With particular reference to FIG. 4, a method 400 for two-tiered local biometric evaluation includes executing, at one or more processing devices (e.g., the on-vehicle processors 54, 56 or the remote processor 58), a first classification algorithm for estimating a state of the driver at step 402. Execution of the first classification algorithm may include performing a first biometric validation based on at least one biometric quality captured via the vision sensor 16 at step 404. At step 406, the first classification algorithm estimates, or determines, a state of the user 14 in a pass/no-pass paradigm. It is contemplated that the first classification algorithm may be configured to be biased toward false negatives (e.g., biased toward determining an inebriated, intoxicated, distracted, or otherwise "negative" state). For example, for inebriation verification, the first classification algorithm may process the vision signals (e.g., vision data) of the eyes 24 of the user 14 to determine a level of pupil dilation, an eye color (e.g., bloodshot eyes 24), and/or an inability to focus/track passing objects based on a limited number of frames, such as a single frame of the image data. In these examples, if any level of pupil dilation beyond a limited threshold (e.g., 50% of an average pupil dilation in daylight, any determination of red in the eyes 24, or any missed shift in eye gaze based on a lighting pattern of the illumination device 38) may result in an unsuccessful biometric validation. Thus, the first classification algorithm may serve as an initial check that is relatively low in time constraints relative to a second classification algorithm described below. In general, the first classification algorithm may have a first power requirement and the second classification may have a second power requirement greater than the first power requirement.

The biometric validation method 400 further includes executing a second classification algorithm that is performed in response to an outcome of the first biometric validation at step 408. Execution of the second classification algorithm may include performing a second biometric validation based on at least one biometric quality of the user 14 to confirm the state of the user 14 at step 410. At step 412, the second classification algorithm is configured to validate or alter an estimation of the state of the user 14. If the second classification algorithm confirms a no-pass condition of the biometric service being tested, the method proceeds to step 412 of communicating an instruction to control at least one of the operational systems 68 of the vehicle 12 to modify or adjust operation of the vehicle 12 at step 414. For example, determination of an inebriated state may result in limiting enabling of the ignition subsystem to limit operation of the vehicle 12. If either the first classification algorithm or the second classification algorithm results in an output of a pass condition (e.g., determination that the driver is sober or not inebriated), then the method proceeds to communication of a validation system to the operational system 68 to allow operation of one or more of the operational systems 68 of the vehicle 12 (e.g., the powertrain system 70, the ignition system 72, or the like) at step 416. It is contemplated that validation checks may be performed by other systems within the vehicle 12 to confirm the detected state of the user 14, and that, in some examples, the testing performed by the system is not intended to replace other confirmed methods for determining a state of the driver.

It is contemplated that the architecture described in relation to method 400 may be employed for clearly-defined successful or unsuccessful conditions. For example, biometric services such as inebriation verification, driver engagement, facial recognition, face liveliness, and the like may be validated using the method 400. In addition, it is contemplated that an unsuccessful condition may include an inconclusive condition in which the first classification algorithm results in an unknown or unpredicted result. For example, if the first classification algorithm is unable to confirm a particular state (e.g., identity, sobriety), then such result may be treated as a negative outcome and the second classification algorithm will be executed. It is further contemplated that other pass/no-pass tests may be employed in the method 400 for determining user states based on biometric qualities of the user 14, such as fatigue verification and other biometric services previously described.

Turning now more particularly to FIG. 5, a method 500 for multistate estimation may be employed via the processors 54, 56, 58. The software architecture employed via method 500 is similar to the software architecture employed for method 400 but may be configured to validate a non-binary classification for a state of the user 14. For example, determining an agitated state of the user 14, a fatigued state of the user 14, a calm state of the user 14, an enraged state of the user 14, or the like, may be incorporated into the algorithms of the method 500, and therefore may result in a multitude of states predictable based on the biometric quality. In general, the steps of executing the first classification algorithm, including performing the first biometric validation based on at least one biometric quality and estimating a state of the user 14 (e.g., steps 402-406) may be employed in the present method 500 via steps 502-506. Similarly, the steps of executing the second classification algorithm based on the outcome of the first biometric validation, as well as the sub-steps of the second classification algorithm (e.g., steps 408-412) may further be performed by the method 500, via steps 508-512. Different from method 400, the method 500 for multistate estimation may include reporting, or communicating, a confidence level for a state of the driver determined based on the vision signal between the first and second classification algorithms. For example, the first classification algorithm may be configured to estimate one of 5 to 10 states of the driver, such as those previously described, in the form of an emotional state, or a stress level. The degree of confidence may, as previously described, be non-binary (e.g., 25%, 50%, etc.). Based on the confidence level exceeding a predetermined threshold that may be biased toward a false negative determination, the method 500 may proceed to execution of the second classification algorithm 508 or may proceed to determination of the emotional/stress level state in a pass condition. Thus, the unsuccessful state previously described with relation to method 400 may rather correspond to an insufficient degree of certainty to meet a predetermined confidence threshold. In some examples, the confidence threshold is between 75% and 100%, though other verification ranges may be utilized.

By way of example, the first biometric validation may include body-pose analysis for target positions 100 and/or landmark analysis of various facial features of the driver, such as raised eyebrows, an open mouth 102, various wrinkles formed along the forehead, or other landmark features that will be described further in relation to FIG. 7. Based on this landmark analysis, the first classification algorithm may determine that the driver is one of excited, angry, or the like. In general, the confidence level may be determined based on target points for the various landmarks of the face, such that a comparison between the determined landmarks to the target landmarks may allow the processors 54, 56, 58 of the present disclosure to predict the state of the user 14.

Execution of the second classification algorithm may include spatiotemporal 3D regression modeling performed in one or more neural networks 64, or identified via processing of the facial features captured in the vision signals in the trained machine learning models 62 previously described in relation to FIG. 3. Other verification algorithms may also or alternatively be employed, such as multimodal fusion techniques. For example, the second classification algorithm may incorporate audio data related to verbal communication of the user 14, including, for example, a volume, an intensity, an enunciation, or the like, of words from the user 14. In other examples, further processing of an increased number of image frames (or video data), for example, use of additional hardware (e.g., the microphones 84), or the like may be employed to validate the state of the driver.

Still referring to FIG. 5, following an output of the second classification algorithm or a high confidence output of the first classification algorithm may result in communicating an instruction to control the operational systems 68 of the vehicle 12 depending on the state determined by the method 500. For example, at step 514, the signal communicated to control the operational systems 68 may be particular to the specific state identified. In some examples, determination of a fatigued state may result in control of the vehicle 12 off of a road to a parking area, including slowing the speed of the vehicle 12 or the like. In other examples, determination of an agitated, or enraged state (e.g., due to road rage), may result in limiting the speed or motion. It is contemplated that communication between the processors 54, 56, 58 of the present disclosure and the various operational systems 68 described herein may be overridden or responsive to detection of various conditions of the user 14.

Referring to FIG. 6, a redundancy method for determining the state of the user 14 includes performing the first and second classification algorithms as previously described with respect to FIGS. 4 and 5 in parallel, such that an intermediate step of determining agreement between the light and heavy algorithms is provided. For example, the method 600 may include executing the first classification algorithm at step 602 and executing the second classification algorithm in parallel with the execution of the first classification algorithm at step 604. The outputs of both steps 602 and 604 may be compared to one another at step 606. For example, in a binary system, such as the system previously described with respect to method 400, a pass/no-pass of the rapid algorithm may be compared to a pass/no-pass of the heavy algorithm at step 606 and, if both outputs agree, the method 600 may communicate an instruction to control various subsystems of the vehicle 12 based on the verified state at step 608. In the event that the light and heavy algorithms do not agree, the method 600 employed by the various processors 54, 56, 58 of the system 10 may include reporting an inconclusive validation, which may result in a negative condition resulting in limiting operations of the vehicle 12, at step 610. The method 600 employed by the biometric evaluation system 10 of the present disclosure may apply differently depending on that specific biometric service employed by the system, and may particularly depend on a rating level for the system.

Figure 7:
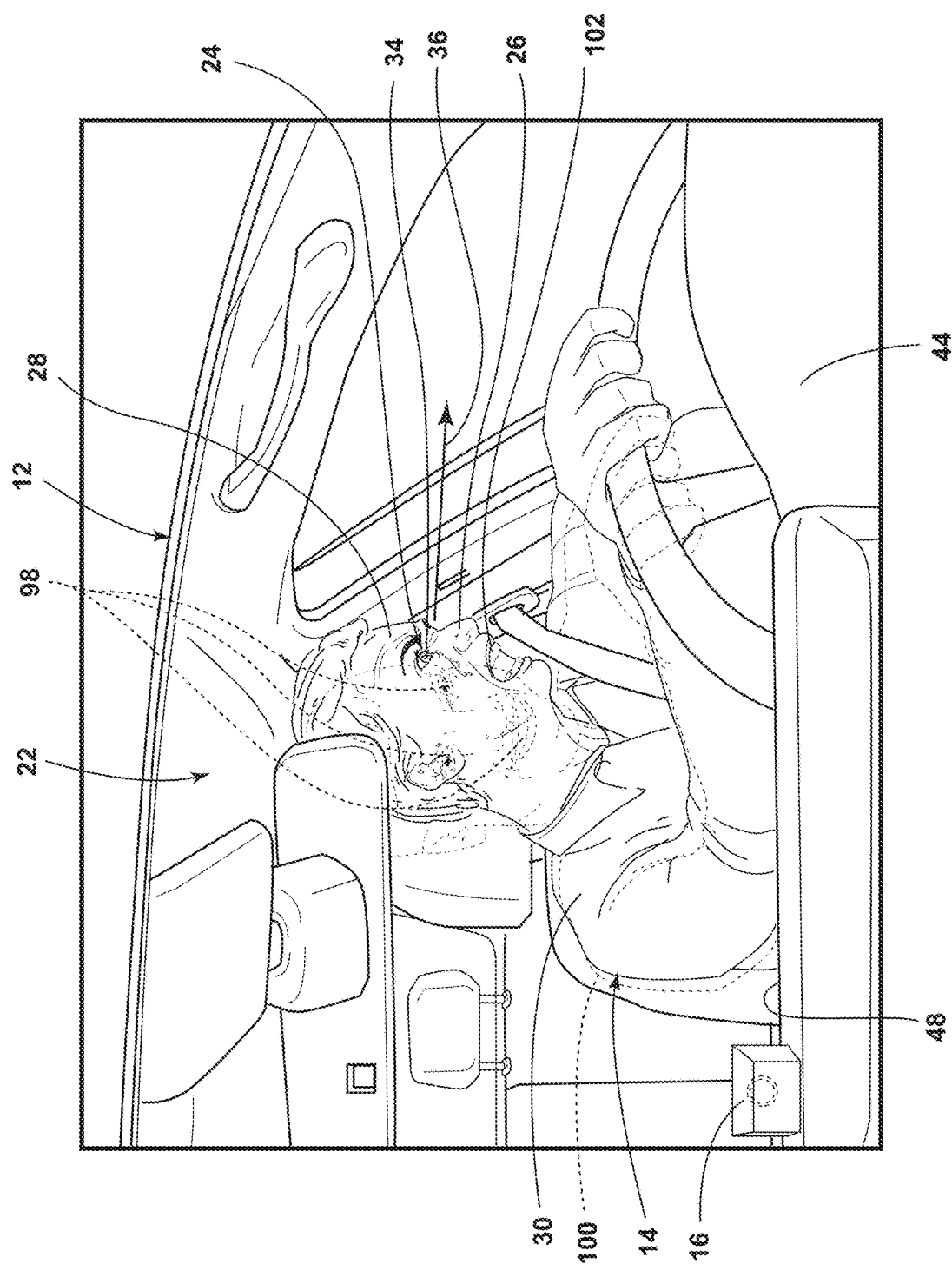
FIG. 7 is a perspective view of a user in an interior of a vehicle with target biometrics overlaying actual biometrics of the user.

Referring now to FIG. 7, an exemplary image of the user 14 captured via the vision sensor 16 demonstrates various target positions 98 determined by the processors 54, 56, 58 of the present disclosure in order to provide estimations and/or validations of biometric qualities. For example, binary state estimations, as well as multistate estimations, may be performed based on various body positions (e.g., body pose), facial feature prediction (e.g., landmark analysis), as well as the previously described audio feedback analysis. As depicted, a target pose 100 corresponding to a non-distracted state of the user 14 may be compared with an actual pose of the user 14. As shown, the user 14 may have a hunched or agitated pose or a hands-off of the wheel pose that may be determined by the one or more processors 54, 56, 58 based on edge detection analysis performed on the vision signal. Based on a comparison between the target pose 100 and the actual pose, the biometric evaluation system 10 may determine that the user 14 is distracted, fatigued, or the like. The pose identification algorithm may be performed in the second classification algorithm following the estimation of a distracted state based on landmark analysis of the face.

With continued reference to FIG. 7, the first classification algorithm may analyze various data points on the face, such as the eyes 24, the forehead area 28, the mouth 102, etc., and compare such features to target features associated with a non-distracted state, non-fatigued state, or another target state of the user 14. In the example presented above, the first classification algorithm may determine that the driver is distracted based on gaze estimation corresponding to pupil alignment with a particular area. Wrinkles identified in the vision signal, or the image data, may be incorporated into the first classification algorithms to determine a level of distraction, an emotional state, a stress level state, or the like. As illustrated, the one or more processors 54, 56, 58 may identify tears, the open mouth 102, head wrinkles, stretched skin along the edges of the mouth 102, or the like, and, while not determining a particular emotional state, may determine a non-approved state of the user 14 for operation of the vehicle 12 or motion of the vehicle 12.

In the example illustrated, the first classification algorithm performed under the emotional state detection method 500 previously described may be configured to detect the various features of the face, via the landmark analysis (e.g., pupil direction, detection of wrinkles, or the like), and estimate a stressed state of the user 14. The second classification algorithm of the method 500 may then be configured to perform 3D regression modeling to determine the existence of the tears or the open mouth 102 to determine that the user 14 is shouting or otherwise expressing verbal communication. This second biometric evaluation may be performed in one of the machine learning models 62 or neural networks 64 previously described to determine these particular spatiotemporal aspects. It is contemplated that the methods 400 and 600 may also be performed using image data presented in FIG. 7 to determine various binary (successful/unsuccessful) stages, such as a determination of inebriation, fatigue, distraction, or the like.

Figure 8:
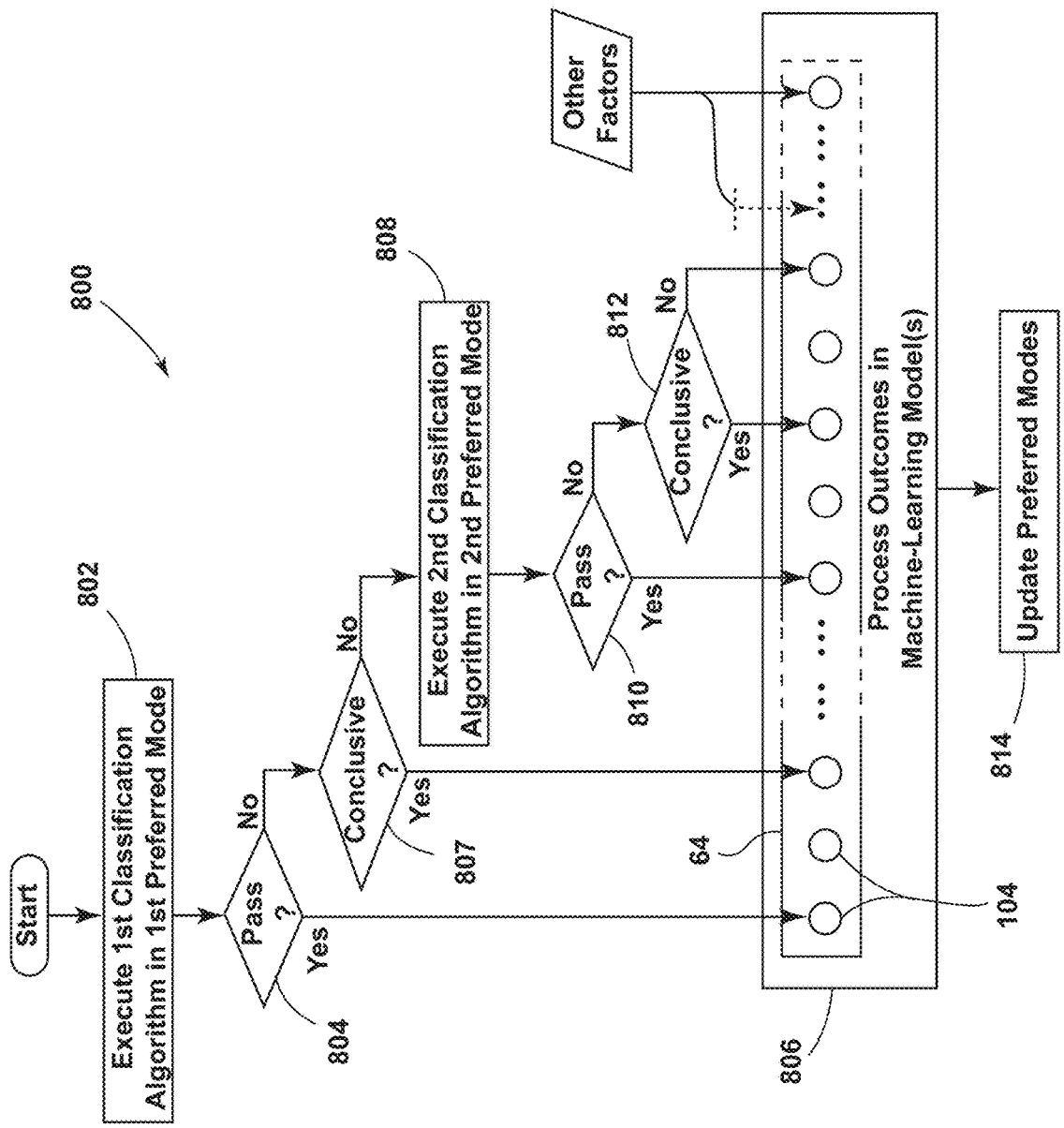
FIG. 8 is a flowchart demonstrating a method of performing a biometric service according to one aspect of the present disclosure.

Referring now to FIG. 8, a method 800 for determining biometric evaluation classification tests will now be described in reference to an identification task, though any of the previously described functions may employ the present method 800. At step 802, the method 800 executes the first classification algorithm in a first preferred mode. For example, the first preferred mode may be one of many testing modes for performing the rapid user identification methods previously described, such as performing edge detection on the face of the user 14 to identify unique facial features to determine the identity of the user 14. At step 804, the method determines whether or not the user 14 passed the identification test by matching with a user identity. If so, such a result is recorded and fed to a machine learning model at step 806. Although illustrated as incorporating a plurality of nodes in a neural network, it is contemplated that the machine learning model 62 trained to determine preferred testing modes of the present method may employ alternative means for updating the prioritization of the testing mode for the first and second classification algorithms, as will be further described below.

If the first biometric evaluation does not pass, at step 807, the method determines whether the rejection was the result of a conclusive rejection or a result of an inconclusive analysis of the vision signal. For example, if a scarf, glasses, a hood, or other obstructions are donned by the user 14 to secure one or more features of the user 14 (e.g., identification features), the first classification algorithm may output an unsuccessful condition as a result of inconclusive analysis. Alternatively, step 807 may result in determination of a conclusive negative by identifying features of the user 14 consistent with another user identity not approved by the biometric evaluation system 10. The results of either may further be incorporated into the machine learning model 62 to train the system to select or otherwise prioritize a particular mode for performing the first classification algorithm.

Steps 808-812 may then be performed with respect to the second classification algorithm via a second preferred mode. For example, the second preferred mode may be performing iris 34 authentication analysis, performing pose detection to determine a height of the user 14, or various other identification methods previously described in relation to employing a computationally heavy algorithm. Determination of passing, rejecting conclusively, or rejecting inconclusively may include communicating an output of each to a specific neural node 104 of the neural network 64 employed to train the machine learning model 62.

In step 814, the machine learning model 62 is trained to update the software architecture scheme based on the rates of false positives, false negatives, and inconclusive negatives of either or both the first classification algorithms and the second classification algorithms and the preferred modes. The machine learning model 62 is trained to output updated preferred modes based on this data to optimize runtime and reduce computational load and/or electrical power load. Thus, the method 800 may recursively track the test results and modify the testing modes based on the results. For example, if the first preferred mode of the first classification algorithm described above results in a significant (e.g., greater than average) false negative rate, the machine learning model 62 may select a different mode of performing the identification function, such as receiving audible name and identification information verbally from the user 14. In some examples, the machine learning model 62 selects elimination, or bypassing, of the first classification algorithm altogether and skips directly to the second classification algorithm of performing an iris 34 scan, for example. It is contemplated that this decision is driven by historical data related to false negative/positives and inconclusively of previously performed testing. In further examples, other factors not related to the specific testing may be employed in the training of machine learning models 62, including lighting level, date, time of day, particular body shape, a specific user identity, or the like. For example, certain tests may be determined to be unsuccessful for a particular user, whereas for other users, such tests may be accurate and efficient. It is contemplated that these other factors may be determined based on the vision signals being captured and/or audible signals, image data, or the like captured from previously described sensors.

In general, a robust architecture is provided to reduce computation and/or electrical power consumption time required to perform biometric evaluations with sufficient efficiency. For example, by providing two modes of determining a particular evaluation service, the latency and/or electrical power consumption may be reduced significantly. Further optimization may be employed by providing individualized feedback and testing the employment of the machine learning model architecture. Additionally, by offloading various tasks to other processing units and/or separate algorithms, electrical power may be conserved and relegated to one particular module of the system for most cases, and various signaling may be unnecessary to adequately perform the biometric evaluation service.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A biometric evaluation system for a vehicle, comprising:
    a vision sensor configured to detect at least one biometric quality of a user;
    an operational system for the vehicle; and
    at least one processor coupled with a memory and in communication with the vision sensor, the processor being configured to:
        execute a first classification algorithm that performs a first biometric validation based on the at least one biometric quality to estimate a state of the user, the first classification algorithm requiring a first service latency;
        in response to an outcome of the first biometric validation, execute a second classification algorithm that performs a second biometric validation based on the at least one biometric quality to confirm the state of the user, the second classification algorithm requiring a second service latency separate from and greater than the first service latency; and
        communicate a signal to the operational system to modify operation of the vehicle based on at least one of the first and the second biometric validations.

2. The system of claim 1, wherein the first and second service latencies include first and second response times, respectively.

3. The system of claim 2, wherein the first response time is less than the second response time.

4. The system of claim 1, wherein the at least one processor includes a local processor and an edge processor in communication with the local processor, wherein the local processor is configured to execute the first classification algorithm and the edge processor is configured to execute the second classification algorithm.

5. The system of claim 1, wherein the outcome of the first classification algorithm is one of a pass condition and an unsuccessful condition, and wherein the at least one processor is configured to execute the second classification algorithm in response to the unsuccessful condition.

6. The system of claim 5, wherein the first classification algorithm is biased toward the unsuccessful condition.

7. The system of claim 1, wherein the operational system includes an electromechanical output device selectively energized based on the signal.

8. The system of claim 7, wherein the operational system is a powertrain system and the communication of the signal is performed in response to an unsuccessful condition of each of the first and second biometric validations.

9. The system of claim 8, wherein the outcome of the first classification algorithm is one of a pass condition and an unsuccessful condition, and wherein the at least one processor is configured to execute the second classification algorithm in response to the pass condition.

10. The system of claim 1, wherein the outcome of the first classification algorithm and an outcome of the second classification algorithm are each one of a multi-state output corresponding to an emotional state of the user.

11. The system of claim 10, wherein the first classification algorithm performs facial landmark analysis based on image data captured by the vision sensor and the second classification processes the image data in a neural network.

12. The system of claim 1, wherein the at least one processor is further configured to:
    recursively track an output of the first biometric validation applied to the user to determine a false negative rate of the first biometric validation for the user; and
    modify the first biometric validation based on the false negative rate.

13. The system of claim 12, wherein modifying the first biometric validation includes bypassing execution of the first classification algorithm.

14. The system of claim 12, wherein modifying the first biometric validation includes performing an alternative biometric validation based on the at least one biometric quality in lieu of performing the first biometric validation.

15. The system of claim 1, wherein the state is one or more of a liveliness level of the user, an identity of the user, an inebriated state of the user, and an engagement level of the user.

16. A biometric evaluation system, comprising:
    a vision sensor configured to detect at least one biometric quality of a user;

an electromechanical output device selectively energized based on an evaluation of the at least one biometric quality of the user;

a first processor coupled with a memory and in communication with the vision sensor, the first processor being configured to execute a first classification algorithm that performs a first biometric validation based on the at least one biometric quality to estimate a state of the user, the first classification algorithm requiring a first response time;

a second processor in communication with the first processor and configured to, in response to an outcome of the first biometric validation, execute a second classification algorithm that performs a second biometric validation based on the at least one biometric quality to confirm the state of the user, the second classification algorithm requiring a second processing response time, the second response time being longer than and separate from the first response time; and an operational system in communication with the first and second processors configured to limit actuation of the electromechanical output device in response to not passing of both the first and second biometric validations.

17. The system of claim 16, wherein the at least one processor is further configured to:

recursively track the outcome of the first biometric validation applied to the user to determine a false negative rate of the first biometric validation for the user; and modify the first biometric validation based on the false negative rate.

18. The system of claim 17, wherein modifying the first biometric validation includes bypassing execution of the first classification algorithm.

19. The system of claim 17, wherein the electromechanical output device is configured to control a security operation for a building.

20. A method of evaluating a biometric quality of a driver of a vehicle, the method comprising:

capturing at least one image of the driver via a vision sensor;

executing, via at least one processor in communication with the vision sensor, a first classification algorithm that performs a first biometric validation based on the biometric quality to estimate a state of the driver, the first classification algorithm requiring a first processing power level;

based on the estimation of the state of the driver, executing, at the at least one processor, a second classification algorithm that performs a second biometric validation based on the biometric quality to confirm the state of the driver, the second classification algorithm requiring a second processing power level, the second processing power level being greater than the first processing power level, wherein the first classification algorithm has a service latency shorter than and separate from a service latency of the second classification algorithm; and communicating an instruction to adjust an operational system of the vehicle in response to the state of the driver.

* * * * *